United States Patent [19]

Tanaka et al.

[11] Patent Number: 5,369,715
[45] Date of Patent: Nov. 29, 1994

[54] OPTICAL CHARACTER RECOGNITION SYSTEM

[75] Inventors: Hideaki Tanaka, Daito; Toshiaki Morita, Nara; Yoshihiro Kitamura, Osaka, all of Japan

[73] Assignee: Sharp Kabushiki Kaisha, Osaka, Japan

[21] Appl. No.: 693,247

[22] Filed: Apr. 26, 1991

[30] Foreign Application Priority Data

Apr. 27, 1990 [JP] Japan .................. 2-112296

[51] Int. Cl.⁵ .................. G06K 9/46; G06K 9/34
[52] U.S. Cl. .................. 382/18; 382/9
[58] Field of Search .............. 382/9, 18, 48, 19, 16

[56] References Cited

U.S. PATENT DOCUMENTS

| | | | |
|---|---|---|---|
| 4,251,799 | 2/1981 | Jih | 382/18 |
| 4,377,803 | 3/1983 | Lotspeich et al. | 382/9 |
| 4,860,376 | 8/1989 | Tanaka et al. | 382/9 |
| 4,918,740 | 4/1990 | Ross | 382/9 |
| 4,926,492 | 5/1990 | Tanaka et al. | 382/18 |
| 4,998,285 | 3/1991 | Suzuki et al. | 382/9 |

FOREIGN PATENT DOCUMENTS

| | | |
|---|---|---|
| 63-216189 | 9/1988 | Japan . |
| 6429986 | 1/1989 | Japan . |
| 1231186 | 9/1989 | Japan . |

*Primary Examiner*—Yon J. Couso
*Assistant Examiner*—David Fox
*Attorney, Agent, or Firm*—Morrison & Foerster

[57] ABSTRACT

A histogram is prepared using the heights of characters in an input alphanumeric character image data set. Based on this histogram, reference line characters are detected from the character row. The upper and lower extracting ordinates of each character in the character row are obtained. Then, the average of each of the upper and lower extracting ordinates in the character row is determined as the ordinate of a reference line for the character row. Thus obtained reference line is used for character recognition.

8 Claims, 4 Drawing Sheets have a well-designed interface that
uses menus and prompts for selecting
and confirming options. You can
press Escape to back out of a menu,
an entry, or a set of entries.
It is difficult or impossible to make
ommitting errors with this program,
as it always and entries you make.
Once you're up to speed on the pro-
gram, you can select the Advanced
mode, which disables some of the Back
tree So
Road, N
247-322
P luss, II
RAM an
Business
  Busin
full-fea
that of
bles, re

FIG. 4 ect of
which
  up-
shing
P lus
ently
mers
men-
be a
that
order
bove)

have
earn-
J une processor will run applications faster and
facilitate broader peripheral connectivity.
Also important is the new system's com-
plete compatibility with the already in-
stalled base of Pinnacle systems. Because
backlog probably would fall off sharply if
the system were received indifferently, we
think the success of this upgrade will be
the key to I S C's future prospects.
These shares have superior appreciation
potenial to 1990-92. I S C is showing
strong momentum in its shift in emphasis
from savings banks to commerical banks,
where market penetration is considerably
lower. Also, its exporatory projects in the
Far East look promising. The gains we've

FIG. 5

OPTICAL CHARACTER RECOGNITION SYSTEM

BACKGROUND OF THE INVENTION

1. Field of the Invention:

The present invention relates to an optical character recognition system, and also to a method of setting reference lines which are useful in character recognition by an apparatus such as an OCR (Optical Character Reader) for recognizing printed alphanumeric characters.

2. Description of the Prior Art:

When alphanumeric characters printed on a paper sheet are to be recognized using an OCR, image data of the characters are first input to the OCR, and a string of character image data is isolated from the input data. Hereinafter, such a string of character image data is referred to as "a character row". Then, reference lines (generally, two reference lines) are formed in the character row.

Reference lines are virtual or assumed lines which are set in the direction of the character row so as to respectively elongate along the upper and lower extracting ordinates (or upper and lower extracting lines) of characters having neither upward projecting portions nor downward projecting portions, i.e., characters such as "a", "c", "e", "m", "n", "o", "r", "s", "u", "v" and "w". These characters are hereinafter referred to as "reference line characters".

Such reference lines are used for character recognition in order to differentiate similar characters (e.g., capital and small letters such as "S" and "s", "C and "c", etc.) or marks in the same shape but in different positions (e.g., "''" and ",", "." and ".", etc.). These similar characters or same-shaped marks can be recognized by detecting their positions relative to the reference lines.

In a conventional system of setting reference lines from a character row, coordinates of pixels which constitute the character images are first detected. Then, a histogram is prepared to obtain the frequency distribution, i.e., the number of the pixels existing along each horizontal direction. From the resulting histogram, two points at which the frequency distribution exhibits the greatest change along the vertical axis are detected. Two horizontal lines which respectively intersect these two points are determined as reference lines. In other conventional systems of setting reference lines, a histogram prepared from horizontal line segments alone (Japanese Laid-open Patent Publication No. 64-29986) is used; a weighted histogram prepared along the horizontal axis is used; or the results of character recognition are utilized (Japanese Laid-open Patent Publication No. 63-216189).

The conventional system utilizing a histogram prepared from the number of pixels in each horizontal direction has a drawback that, when a paper sheet is not appropriately placed in the OCR, character strings printed on the sheet are inclined with respect to a reading unit of the OCR, so that the OCR cannot detect areas between adjacent character strings. More specifically, no significant change appears along the vertical axis of the resulting histogram. Thus, reference lines cannot be accurately set.

In the conventional system utilizing the results of character recognition, the accuracy in setting reference lines depends on the accuracy in the character recognition. Thus, when characters cannot be accurately recognized, reference lines cannot be set with accuracy.

SUMMARY OF THE INVENTION

The optical character recognition system of this invention, which overcomes the above-discussed and numerous other disadvantages and deficiencies of the prior art, comprises: means for reading images of a character row to generate an image data set of a character row; means for preparing a graph which indicates the frequency distribution of the heights of all characters included in said character row; means for extracting characters from said all characters, based on said graph, the ordinates of the upper and lower extreme end portions of each of said extracted characters being assumed to be respectively on reference lines; and means for selecting the average of the upper extracting ordinates of said extracted characters as the ordinate of one of said reference lines, and the average of the lower extracting ordinates of said extracted characters as the ordinate of the other of said reference lines.

The method according to the invention comprises the steps of: preparing a graph which indicates the frequency distribution of the heights of all characters included in a character row; extracting characters from said all characters, based on said graph, the ordinates of the upper and lower extreme end portions of each of said extracted characters being assumed to be respectively on reference lines; and selecting the average of the upper extracting ordinates of said extracted characters as the ordinate of one of said reference lines, and the average of the lower extracting ordinates of said extracted characters as the ordinate of the other of said reference lines.

In preferred embodiments, a character row is divided into a plurality of segments, and the average of the upper extracting ordinates of extracted characters included in one of the segments is selected as the ordinate of one of the reference lines in said one segment, and the average of the lower extracting ordinates of the extracted characters included in the segment is selected as the ordinate of the other of the reference lines in the segment.

In preferred embodiments, a center line which runs through a character row is set, and characters which are crossed by the center line are determined to be included in the character row.

Thus, the invention described herein makes possible the objectives of:

(1) providing an optical character recognition system in which one or more reference lines can be accurately set regardless of inclination or positional deviation of a paper sheet on which characters to be recognized are printed;

(2) providing an optical character recognition system in which one or more reference lines can be accurately set irrespective of the accuracy in character recognition of the system;

(3) providing a method by which one or more reference lines can be accurately set regardless of inclination or positional deviation of a paper sheet on which characters to be recognized are printed; and (4) providing a method by which one or more reference lines can be accurately set irrespective of the accuracy in character recognition of an optical character recognition system.

In a preferred embodiment of the present invention, first, characters which intersect the horizontal center line of an input alphanumeric character row are detected. Then, a histogram is prepared using the heights of all the detected centerline intersecting characters in the character row. One third of the average of the character heights is calculated from the histogram, so that the histogram is divided by a horizontal line intersecting the point of the one-third value, into upper and lower regions. From the upper region, a trough portion of the histogram is detected. Then, a peak is detected from a region of the histogram positioned lower than the trough portion and higher than the horizontal line intersecting the point of the one-third value. Since the detected peak corresponds to the reference line characters, the character height corresponding to the peak is determined as a threshold value for identifying reference line characters. Based on this threshold value, the reference line characters are identified according to a predetermined expression.

Next, the character row is divided into a plurality of segments each having a predetermined number of pixels. When a segment has one or more reference line characters, the ordinates of the uppermost or lowermost portions of the reference line characters in the segment are obtained. The ordinates thus obtained are averaged, so that the averaged value is determined as the ordinate of a reference line for the segment. When a segment has no reference line characters, the reference line character located closest to this segment is detected from another segment. The ordinate of the uppermost or lowermost portion of the thus detected character is determined as the ordinate of a reference line for the segment. In this way, the ordinates of reference lines for all the segments are determined.

According to the preferred embodiment, as described above, the average of ordinates of the uppermost or lowermost portions of reference line characters is determined as the ordinate of a reference line for the character row. Thus, neither positional deviation of a paper sheet nor accuracy in character recognition affects the accuracy in the setting of a reference line.

BRIEF DESCRIPTION OF THE DRAWINGS

This invention may be better understood and its numerous objects and advantages will become apparent to those skilled in the art by reference to the accompanying drawings as follows:

FIG. 4 shows character rows from which reference line characters have been extracted.

FIG. 5 shows character rows from which reference lines have been formed.

DESCRIPTION OF THE PREFERRED EMBODIMENTS

Figure 1:
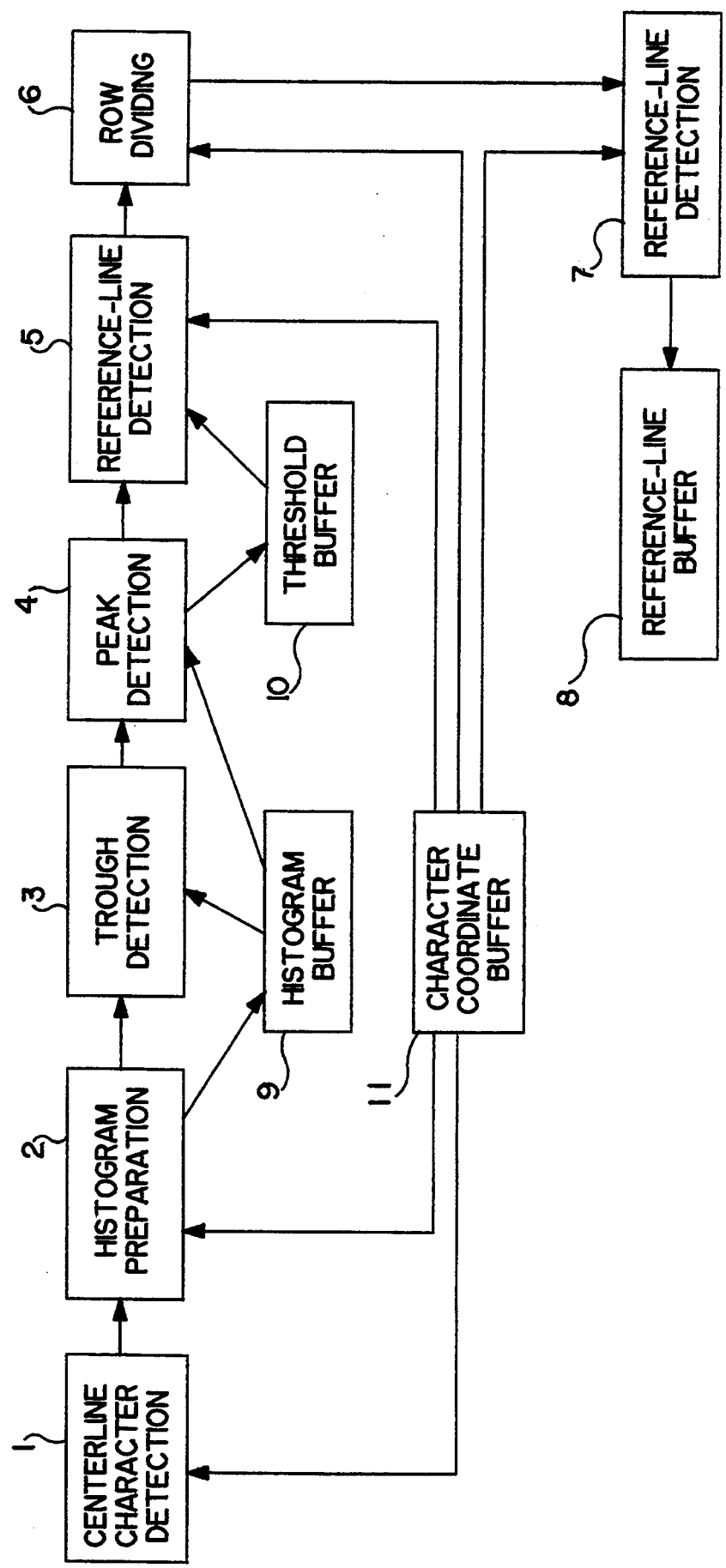
FIG. 1 is a block diagram of a system according to the invention.

FIG. 1 illustrates an optical character recognition system according to the invention. This character recognition system is used for recognizing alphanumeric characters printed on a paper sheet. In character recognition, image data of alphanumeric characters printed on a paper sheet are input to the system, and a character row is isolated from the input data. The isolated character row is fed into the system of FIG. 1. This system comprises a centerline character detecting unit 1 to which the image data of an isolated character row are input, a histogram preparing unit 2 coupled to the centerline character detecting unit 1, and a histogram buffer memory 9 coupled to the histogram preparing unit 2. On receiving image data of the character row, the centerline character detecting unit 1 detects all the characters intersecting the horizontal center line of the character row. The detected results are fed to the histogram preparing unit 2 in which a histogram is prepared using the heights of the detected centerline intersecting characters. According to this embodiment, the height of a character is calculated as the difference in ordinates of the upper and lower extreme end portions of the character. The histogram prepared by the histogram preparing unit 2 is sent to the histogram buffer memory 9 to be stored therein.

Figure 2:
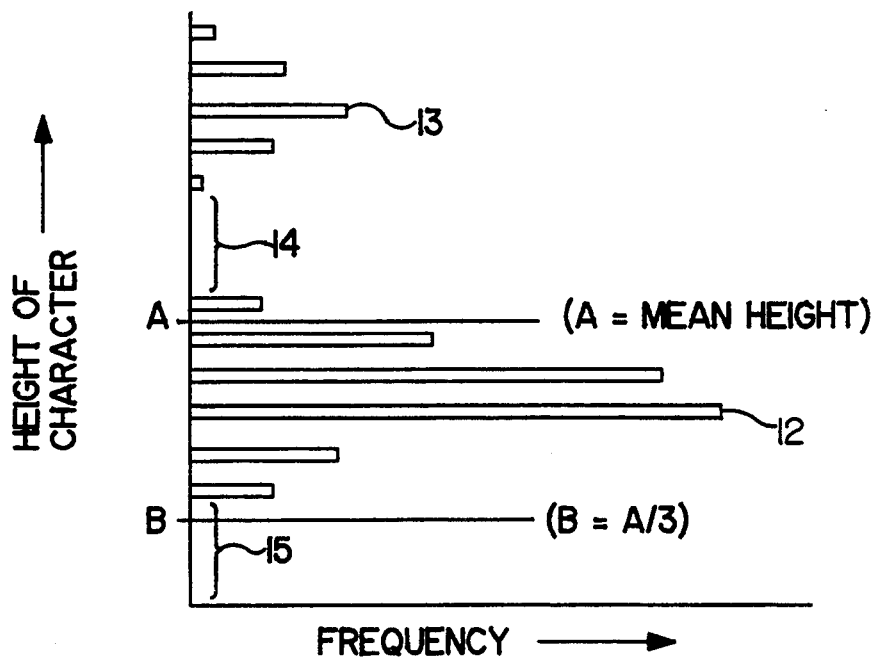
FIG. 2 is a histogram prepared from a normal character row.

FIG. 2 shows a histogram prepared by the histogram preparing unit 2 from a normal character row (i.e., a character row having many reference line characters such as "e", "m", etc). In this histogram, the abscissa indicates the frequency of characters of a certain height existing in the character row, while the ordinate indicates the height of characters. As can be seen from the histogram, there are two main groups of bars which form two projecting portions each having a peak 12 or 13. The peak 12 of the projecting portion located in the lower region of the ordinate axis (i.e., in the region indicating smaller character heights) corresponds to reference line characters. The reference line characters have their uppermost portions located on a reference line (upper reference line) to be set, and lowermost portions located on another reference line (lower reference line). The peak 13 of the projecting portion located in the higher region of the ordinate axis (i.e., in the region indicating larger character heights) corresponds to characters which have portions projecting above the upper reference line to be extracted (e.g., "1", "A", etc.; these characters are hereinafter referred to as "upper-portion projecting characters"). As described above, a normal character row has many reference line characters rather than upper-portion projecting characters. Thus, the peak 12 of the projecting portion at the lower ordinates (which corresponds to the reference line characters) is the greatest peak in the histogram of FIG. 2. Therefore, the character height corresponding to the greatest peak in the histogram can be determined as a threshold value used for identifying reference line characters.

Figure 3:
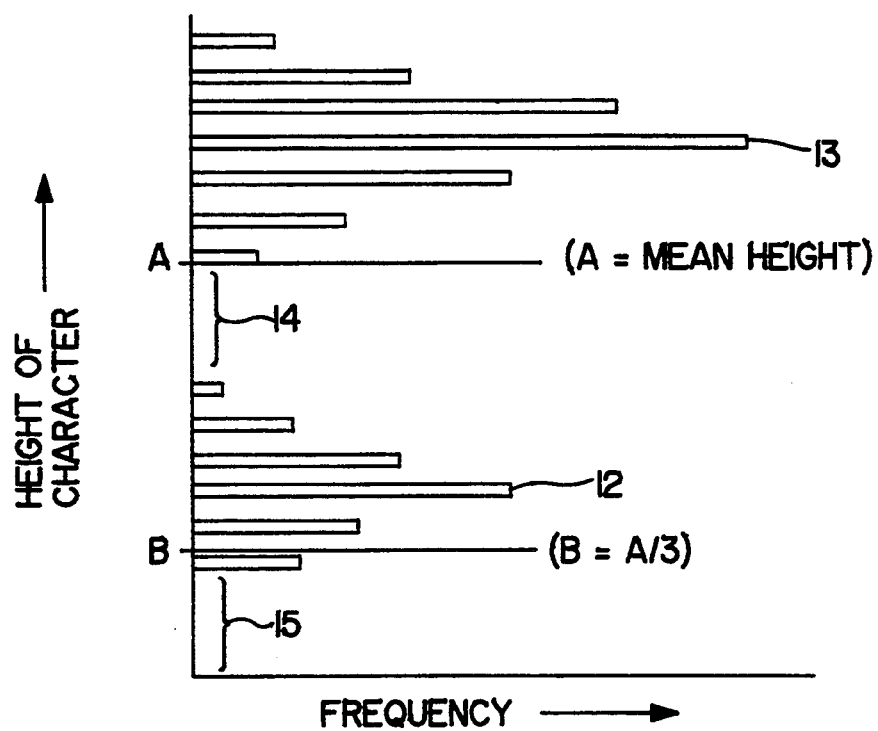
FIG. 3 is a histogram prepared from a character row having many upper-portion projecting characters.

On the other hand, from a character row including many upper-portion projecting characters rather than reference line characters, a histogram such as shown in FIG. 3 can be obtained. In this case, the peak 12 of the projecting portion at the lower ordinates (which corresponds to reference line characters) is not the greatest peak in the histogram, but smaller than the peak 13 of the projecting portion at the higher ordinates. The greatest peak 13 corresponds to upper-portion projecting characters. Therefore, in the histogram of FIG. 3, the character height corresponding to the greatest peak in the histogram cannot be determined as a threshold value for identifying reference line characters.

As described above, a histogram is prepared using the heights of centerline intersecting characters detected by the centerline character detecting unit 1. By using the centerline intersecting characters alone, the histogram can be prepared excluding a symbol or mark such as ","

which, in some fonts, is so large in height that it may be mistaken for a reference line character. However large the height of the mark ",", is, this mark never intersects the horizontal center line of a character row. Thus, according to this embodiment, such symbols or marks can be excluded from the histogram.

According to the embodiment, a peak corresponding to reference line characters can be accurately detected from any of such histograms as shown in FIGS. 2 and 3. In the embodiment, first, a trough portion 14 between the two projecting portions at the higher and lower ordinates is detected. Then, a peak is detected from a lower region of the histogram which is positioned lower than the trough portion 14 along the ordinate axis. The character height corresponding to this peak is determined as a threshold value for identifying reference line characters. This will be described in more detail below.

The system of FIG. 1 further comprises a trough detecting unit 3 which performs the above-described detection of the trough portion 14 between the two projecting portions. The trough detecting unit 3 starts the detection when it receives signals instructing that a histogram has been stored in the histogram buffer memory 9. The trough portion 14 is detected as follows: First, an average height of the characters included in the character row is obtained from a histogram. In FIGS. 2 and 3, the average character heights are indicated by lines A. Next, one third of the average character height A is calculated. The one-third values are indicated by lines B in FIGS. 2 and 3. Each of the lines B divides the corresponding histogram into upper and lower regions. From the upper region of each histogram, a section of the ordinate axis having no bars thereon is detected. This section is determined as the trough portion 14 using the following expression:

$$\sigma^2_{(k)} = \frac{\left[\left(\frac{1}{N}\sum_{i=1}^{H} i \times h_i\right) + \left(\frac{1}{N}\sum_{i=1}^{k} h_i\right) - \frac{1}{N}\sum_{i=1}^{k} i \times h_i\right]^2}{\frac{1}{N}\sum_{i=1}^{k} h_i \left[1 - \frac{1}{N}\sum_{i=1}^{k} h_i\right]} \quad (1)$$

$$(0 \leq k \leq H)$$

where $h_i$ is a frequency at an ordinate i, N is a total of all frequencies, and H is the maximum scale of the histogram. The point k at which $\sigma^2_{(k)}$ exhibits the maximum value is determined as the trough portion.

The histograms of FIGS. 2 and 3 have two trough portions. One is the trough portion 14 positioned between the two projecting portions. The other is a trough portion 15 which is a section of the ordinate axis positioned near the character height of 0. According to the embodiment, as described above, a trough portion is detected from the upper region of the histogram positioned above the one-third value line B. Since the trough portion 15 near the character height of 0 does not substantially extend above the one-third value line B, the detection of the trough portion 14 can be ensured by ignoring the lower region positioned below the one-third value line B.

The system of FIG. 1 further comprises a peak detecting unit 4 coupled to the histogram buffer memory 9 and the trough detecting unit 3. The peak detecting unit 4 detects a peak corresponding to reference line characters, based on the position of the trough portion 14 detected by the trough detecting unit 3. Referring to FIG. 2 or 3, in this embodiment, the peak detecting unit 4 detects a peak positioned between the one-third value line B and the trough portion 14. The detected peak (which is denoted by the reference numeral 12) is determined as the peak corresponding to the reference line characters.

In this way, in the detection of the peak, the region of the histogram which is positioned above the trough portion 14 is ignored. Thus, even if the histogram is prepared from a character row having many upper-portion projecting characters (as shown in FIG. 3), the peak 13 corresponding to the upper-portion projecting characters can be ignored. This ensures accurate detection of the peak 12 corresponding to the reference line characters.

After the detection of the peak 12, the character height corresponding to the peak 12 is determined as a threshold value for identifying reference line defining characters (hereinafter referred to as a "reference-character threshold value"). The reference-character threshold value thus obtained is stored in a threshold buffer memory 10.

A reference line character detecting unit 5 reads out the reference-character threshold value from the threshold buffer memory 10, and detects reference line characters based on the reference-character threshold value and the height of each centerline intersecting character detected by the centerline character detecting unit 1, according to expression (2):

$$abs(H_i - \epsilon) < x \quad (2)$$

where $H_i$ is the height of the ith centerline intersecting character in a character row (i=1, 2, 3, ..., n; n is the number of all the centerline intersecting characters in the character row), $\epsilon$ is a reference-character threshold value, x is the allowance for a deviation from the reference-character threshold value, and abs is an absolute function. When the height of a character is approximately equal to the reference-character threshold value, i.e., when the character height is in the vicinity of the reference-character threshold value ($\pm x$), the character is recognized as a reference line character.

In this way, reference line characters are identified. FIG. 4 shows character rows in which each of the thus identified reference line characters is surrounded by a rectangle. Based on these reference line characters, a reference line is set, as will be described below.

A row dividing unit 6 divides a character row into a plurality of segments each of which has a length of a predetermined number of pixels along the center line. In this embodiment, the length of each segment has 128 pixels. A reference line extracting unit 7 detects the ordinates of the uppermost or lowermost portions of the reference line characters in each segment. These ordinates of the uppermost and lowermost portions are hereinafter referred to as "upper extracting ordinates" and "lower extracting ordinates", respectively. The upper extracting ordinates in each segment are averaged, and the averaged value is determined as the ordinate of the upper reference line LU for the corresponding segment. Similarly, the lower extracting ordinates in each segment are averaged, and the averaged value is determined as the ordinate of the lower reference line LL for the corresponding segment. In this way, reference lines LU and LL are formed in each segment, as shown in FIG. 5.

In this embodiment, since reference lines are formed for each of the segments of a character row, the formation of reference lines requires only a short period of time. The number "m" of the pixels in each segment is adequately made greater with an increase in the allowance for a positional deviation of a paper sheet.

In the above-described operation of the reference line extracting unit 7, if a segment has no reference line characters, the reference line extracting unit 7 detects a reference line character positioned closest to this interested segment, from another segment. Then, the upper or lower extracting ordinate of the detected reference line character is determined as the ordinate of a reference line for the interested segment.

The ordinates of the reference lines thus obtained by the reference line extracting unit 7 are stored in a reference line buffer memory 8, so that they can be read out as required during character recognition.

The ordinates of the respective characters in the character row are stored in a character coordinate buffer memory 11. The stored ordinates of the characters are used: in the centerline character detecting unit 1 for the detection of centerline intersecting characters; in the histogram preparing unit 2 for obtaining the heights of the centerline intersecting characters; in the reference line character detecting unit 5 for detecting reference line characters; in the row dividing unit 6 for detecting the boundaries between characters when dividing a character row into segments; and in the reference line extracting unit 7 for detecting the uppermost and lowermost portions of the respective reference line characters.

Figure 6:
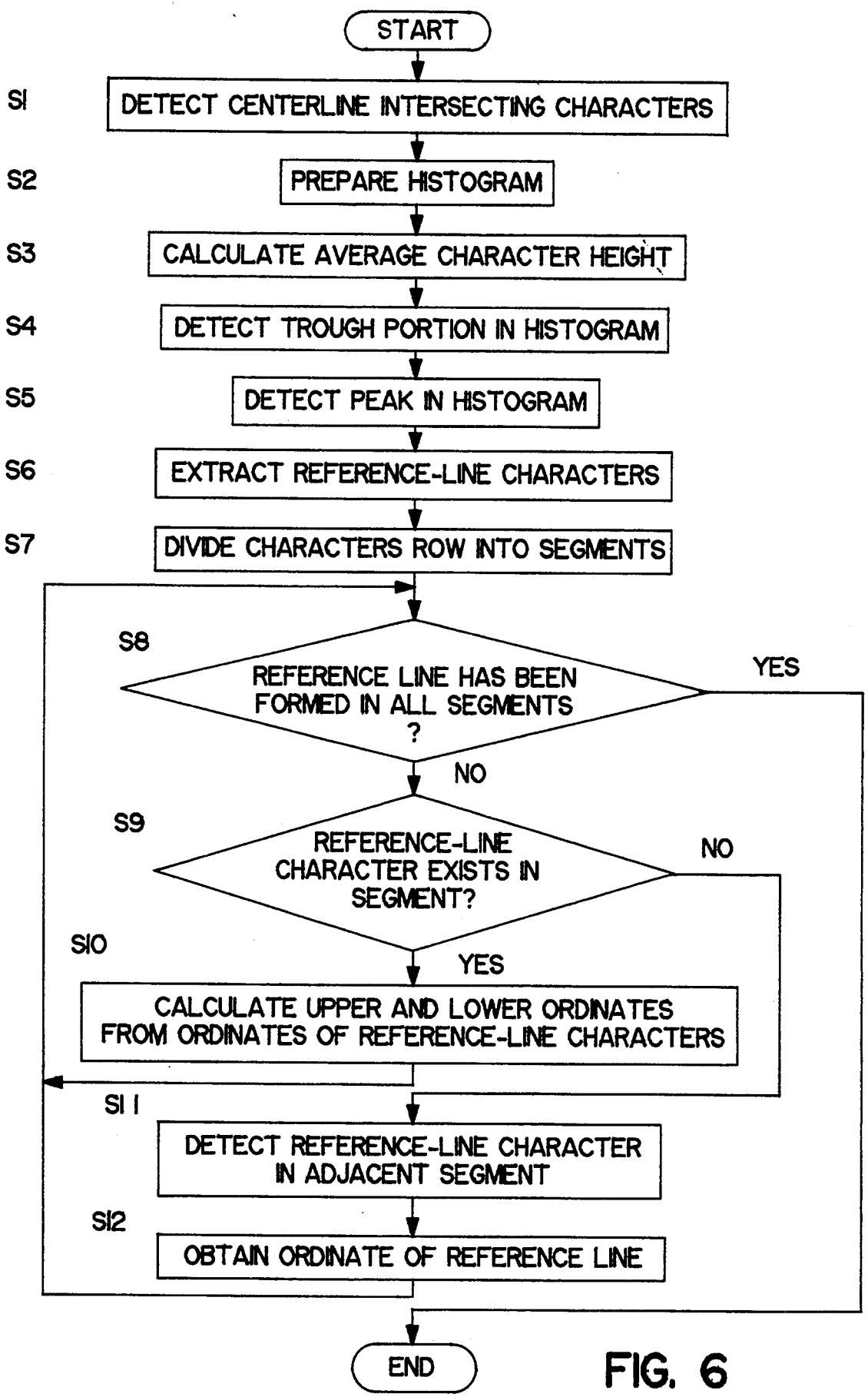
FIG. 6 is a flowchart illustrating the operation of the system of FIG. 1.

FIG. 6 illustrates the process flow for forming a reference line in the embodiment. The procedure in the embodiment will be further described with reference to FIG. 6.

In step S1, centerline intersecting characters are detected from an input alphanumeric character row. Then, a histogram is prepared using the heights of all the detected centerline intersecting characters (step S2). Using the histogram, the heights of all the centerline intersecting characters in the character row are averaged in step S3. Thereafter, one third of the average character height is calculated, and a horizontal line intersecting the ordinate of this one-third value divides the histogram into upper and lower regions. A section of the ordinate axis having no bars thereon is detected from the upper region of the histogram, using expression (1). This section is determined as a trough portion 14 of the histogram (step S4). In step S5, a peak 12 is detected from a region of the histogram which is positioned above the ordinate of the one-third value and below the trough portion 14. The height of the characters corresponding to the peak 12 is determined as a reference-character threshold value. Using the reference-character threshold value, reference line characters are detected according to expression (2) in step S6. Then, the character row is divided into segments having m pixels, in step S7.

In step S8, it is judged whether or not the formation of reference lines for all the segments has been completed. When the formation has not been completed, the process proceeds to step S9.

In step S9, it is judged whether or not a reference line character exists in each of the segments of the character row in which segments a reference line has not yet been formed. When one or more reference line characters exist in a segment (e.g., in a first segment), the process proceeds to step S10. In step S10, the upper or lower extracting ordinates of all the reference line characters in the first segment are averaged, so that the averaged value is output as the ordinate of a reference line for the first segment. The output ordinate is stored in the reference line buffer memory 8. Then, the process returns to step S8.

When it is judged in step S9 that no reference line characters exist in a segment (e.g., in a second segment), the process proceeds to step S11. In step S11, a reference line character positioned closest to the second segment is detected from another segment. Thereafter, the upper or lower extracting ordinate obtained from the detected reference line character is output as the ordinate of a reference line for the second segment (step S12). The output ordinate is stored in the reference line buffer memory 8. Then, the process returns to step S8.

The above-mentioned processes (steps S8→S9→S10→S8, or steps S8→S9→S11→S12→S8) are repeated until the ordinates of reference lines for all the segments are obtained. When it is judged in step S8 that the setting of reference lines for all the segments has been completed, the whole process ends.

In the above-described embodiment, a character row is divided into segments, but the division of a character row is not essential in the present invention. The ordinate of a reference line may be obtained as a series or average of upper or lower extracting ordinates of reference line characters in an entire character row.

In the embodiment, the centerline character detecting unit 1 is provided for excluding symbols or marks which may be mistaken as a character. However, the centerline character detecting unit 1 is not essential in the present invention.

When this invention is applied to a system in which only one reference line is required for character recognition, it is sufficient to form only either of the upper and lower reference lines.

The procedure for extracting reference line characters using the histogram prepared from character heights in the present invention is not restricted to the procedure of the above-described embodiment. The algorithm which can be used in the setting of a reference line in the invention is not restricted to the algorithm used in the above-described embodiment.

As described above, according to the present invention, a histogram is prepared using the heights of characters in an input alphanumeric character image data set. Based on this histogram, reference line characters are detected from the character row. The upper or lower extracting ordinates of each character in the character row are obtained. Then, the average of the upper or lower extracting ordinates in the character row is determined as the ordinate of a reference line for the character row. Therefore, without using a histogram of pixels in horizontal directions or the results of character recognition such as utilized in conventional methods, a reference line can be set in the character row. This means that a reference line can be set with high accuracy regardless of any positional deviation of a paper sheet or accuracy in character recognition.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical character recognition system, comprising:
   means for reading images of a character row to generate an image data set representing characters of said character row;
   means for forming a center line which runs through said character row;
   means for determining characters which are crossed by said center line to be included in said character row;
   means for preparing a graph which indicates the frequency distribution of the heights of said determined characters;
   means for extracting characters from said determined characters, based on said graph, the ordinates of the data of the upper and lower extreme end portions of each of said extracted characters being assumed to be respectively on reference lines;
   means for calculating and selecting the average of the upper extracting ordinates of said extracted characters as the ordinate of one of said reference lines, and the average of the lower extracting ordinates of said extracted characters as the ordinate of the other of said reference lines; and
   means for using said reference lines for character recognition.

2. An optical character recognition system, comprising:
   means for reading images of a character row to generate an image data set representing characters of said character row;
   means for forming a center line which runs through said character row;
   means for determining characters which are crossed by said center line to be included in said character row;
   means for preparing a graph which indicates the frequency distribution of the heights of said determined characters;
   means for extracting characters from said determined characters, based on said graph, the ordinates of the upper and lower extreme end portions of each of said extracted characters being assumed to be respectively on reference lines;
   means for dividing said character row into a plurality of segments;
   means for calculating and selecting the average of the upper extracting ordinates of extracted characters included in one of said segments as the ordinate of one of said reference lines in said one segment, and the average of the lower extracting ordinates of the extracted characters included in said one segment as the ordinate of the other of said reference lines in said one segment; and
   means for using said reference lines for character recognition.

3. An optical character recognition method comprising the steps of:
   acquiring an image data set representing characters of a character row;
   forming a center line which runs through said character row;
   determining characters which are crossed by said center line to be included in said character row;
   preparing a graph which indicates the frequency distribution of the heights of said determined characters;
   extracting characters from said determined characters, based on said graph, the ordinates of the upper and lower extreme end portions of each of said extracted characters being assumed to be respectively on reference lines;
   calculating and selecting the average of the upper extracting ordinates of said extracted characters as the ordinate of one of said reference lines, and the average of the lower extracting ordinates of said extracted characters as the ordinate of the other of said reference lines; and using the reference lines for character recognition.

4. A method according to claim 3, wherein said character row includes alphanumeric characters.

5. A method according to claim 3, wherein said character row includes printed characters.

6. An optical character recognition method comprising the steps of:
   acquiring an image data set representing characters of a character row;
   forming a center line which runs through said character row;
   determining characters which are crossed by said center line to be included in said character row;
   preparing a graph which indicates the frequency distribution of the heights of said determined characters;
   extracting characters from said determined characters, based on said graph, the ordinates of the upper and lower extreme end portions of each of said extracted characters being assumed to be respectively on reference lines;
   dividing said character row into a plurality of segments;
   calculating and selecting the average of the upper extracting ordinates of extracted characters included in one of said segments as the ordinate of one of said reference lines in said one segment, and the average of the lower extracting ordinates of the extracted characters included in said one segment as the ordinate of the other of said reference lines in said one segment; and
   using the reference lines for character recognition.

7. A method according to claim 6, wherein said character row includes alphanumeric characters.

8. A method according to claim 6, wherein said character row includes printed characters.

* * * * *